United States Patent
Nemoto et al.

(10) Patent No.: US 11,969,695 B2
(45) Date of Patent: Apr. 30, 2024

(54) POROUS BODY AND PROCESS FOR MANUFACTURING SAME

(71) Applicants: HOKUETSU CORPORATION, Niigata (JP); THE UNIVERSITY OF TOKYO, Tokyo (JP)

(72) Inventors: Junji Nemoto, Niigata (JP); Toshihiko Soyama, Niigata (JP); Tsuguyuki Saito, Tokyo (JP); Akira Isogai, Tokyo (JP)

(73) Assignees: HOKUETSU CORPORATION, Niigata (JP); THE UNIVERSITY OF TOKYO, Tokyo (JP)

( * ) Notice: Subject to any disclaimer, the term of this patent is extended or adjusted under 35 U.S.C. 154(b) by 696 days.

(21) Appl. No.: 16/853,383

(22) Filed: Apr. 20, 2020

(65) Prior Publication Data
US 2020/0246758 A1    Aug. 6, 2020

Related U.S. Application Data (62) Division of application No. 14/377,902, filed as application No. PCT/JP2012/053549 on Feb. 15, 2012, now abandoned.

(51) Int. Cl.
*B82Y 30/00* (2011.01)
*B01D 39/18* (2006.01)
(Continued)

(52) U.S. Cl.
CPC ............. *B01D 71/10* (2013.01); *B01D 39/18* (2013.01); *B01D 67/0002* (2013.01);
(Continued)

(58) Field of Classification Search
None
See application file for complete search history.

(56) References Cited

U.S. PATENT DOCUMENTS

| | | |
|---|---|---|
| 3,573,158 A | 3/1971 | Pall et al. |
| 5,290,449 A | 3/1994 | Heagle et al. |
| (Continued) | | |

FOREIGN PATENT DOCUMENTS

| | | |
|---|---|---|
| CN | 1946516 | 4/2007 |
| CN | 101851295 | 10/2010 |
| (Continued) | | |

OTHER PUBLICATIONS

International Preliminary Report on Patentability dated Aug. 28, 2014 corresponding to International Patent Application No. PCT/JP2012/053549; 7 pages.
(Continued)

*Primary Examiner* — Marla D McConnell
*Assistant Examiner* — Kevin Worrell
(74) *Attorney, Agent, or Firm* — Ohlandt, Greeley and Perle, LLP (57) ABSTRACT

A process for manufacturing a porous body, includes preparing a dispersion liquid having a dispersion medium with cellulose-based nanofibers that have an average fiber diameter from 1 to 100 nm and dispersed therein, attaching the dispersion liquid to a porous support having a plurality of pores that connect with one another, removing the dispersion liquid attached to a surface of the porous support excluding an inside of pores of the porous support, and subsequently drying the porous support including the dispersion liquid in the pores of the porous support to remove the dispersion medium.

12 Claims, 3 Drawing Sheets

(51) Int. Cl.
*B01D 67/00* (2006.01)
*B01D 69/12* (2006.01)
*B01D 71/02* (2006.01)
*B01D 71/04* (2006.01)
*B01D 71/10* (2006.01)
*C08J 9/00* (2006.01)
*C08J 9/42* (2006.01)
*D06M 15/05* (2006.01)

(52) U.S. Cl.
CPC ... *B01D 67/00793* (2022.08); *B01D 67/0095* (2013.01); *B01D 69/12* (2013.01); *B01D 71/022* (2013.01); *B01D 71/04* (2013.01); *B82Y 30/00* (2013.01); *C08J 9/0085* (2013.01); *C08J 9/42* (2013.01); *D06M 15/05* (2013.01); *B01D 2239/025* (2013.01); *B01D 2239/0654* (2013.01); *B01D 2239/1233* (2013.01); *C08J 2301/00* (2013.01); *C08J 2369/00* (2013.01)

(56) References Cited

U.S. PATENT DOCUMENTS

| | | | | |
|---|---|---|---|---|
| 6,048,464 | A * | 4/2000 | Tanaka | D04H 1/43838 210/488 |
| 2003/0168401 | A1 | 9/2003 | Koslow | |
| 2007/0196401 | A1 * | 8/2007 | Naruse | D21H 15/02 424/443 |
| 2007/0218279 | A1 | 9/2007 | Nonaka et al. | |
| 2008/0203012 | A1 | 8/2008 | Yeager et al. | |
| 2009/0078640 | A1 * | 3/2009 | Chu | B01D 71/12 210/490 |
| 2009/0143227 | A1 | 6/2009 | Dubrow et al. | |
| 2010/0252426 | A1 | 10/2010 | Tsukuda et al. | |
| 2012/0000392 | A1 | 1/2012 | Mukai et al. | |
| 2013/0277297 | A1 | 10/2013 | Suzuki et al. | |

FOREIGN PATENT DOCUMENTS

| | | |
|---|---|---|
| EP | 1757406 | 2/2007 |
| EP | 2006051 | 12/2008 |
| JP | 02-046857 | 2/1990 |
| JP | 0731677 | 2/1995 |
| JP | 9-241396 | 9/1997 |
| JP | 10-291360 | 11/1998 |
| JP | 11-172115 | 6/1999 |
| JP | 2002-210403 | 7/2002 |
| JP | 2005-330639 | 12/2005 |
| JP | 3941838 | 7/2007 |
| JP | 2008-001728 | 1/2008 |
| JP | 2008-12432 | 1/2008 |
| JP | 2008-101315 | 5/2008 |
| JP | 2008101315 | 5/2008 |
| JP | 2008101315 A * | 5/2008 |
| JP | 2008274525 | 11/2008 |
| JP | 2009-057552 | 3/2009 |
| JP | 2010-053461 | 3/2010 |
| JP | 2010-168716 | 8/2010 |
| JP | 2010-202856 | 9/2010 |
| JP | 2010-240513 | 10/2010 |
| JP | 2010-253449 | 11/2010 |
| JP | 2011-38031 | 2/2011 |
| JP | 2012-081533 | 4/2012 |
| JP | 2012-082566 | 4/2012 |
| JP | 2012043103 | 4/2012 |
| WO | 9723266 | 7/1997 |
| WO | 2006004012 | 1/2006 |
| WO | 2007088974 | 8/2007 |
| WO | 2010042647 | 4/2010 |
| WO | 2010073678 | 7/2010 |
| WO | 2011118521 | 9/2011 |
| WO | 2012011559 | 1/2012 |
| WO | 2012/057029 | 5/2012 |

OTHER PUBLICATIONS

Japanese Patent Office Action dated Feb. 12, 2015 corresponding to Japanese Patent Application No. 1 2014-110456; 7 pages.
Chinese Office Action dated Mar. 9, 2015 corresponding to Chinese Application No. 201280069782.3 ; 13 pages.
Japanese Office Action dated Jun. 30, 2015 corresponding to 2014-128038; 10 pages.
Japanese Office Action dated Jun. 2, 2015 corresponding to 2013-558627; 8 pages.
Japanese Office Action dated Apr. 1, 2014 corresponding to Japanese App. No. 2010-227873 with an English translation, 6 pp.
Notification of Reasons for Refusal dated Mar. 15, 2016 from corresponding Japanese Application No. JP2014-110456, 14 pages.
Notification of Reasons for Refusal dated Mar. 15, 2016 from corresponding Japanese Application No. JP2014-128037, 11 pages.
Notification of Reasons for Refusal dated Mar. 15, 2016 from corresponding Japanese Application No. JP2014-146398, 13 pages.
International Search Report dated May 22, 2012 corresponding to PCT/JP2012/053549 with English translation, 5 pp.
Fukuzumi et al., "Transparent and High Gas Barrier Films of Cellulose Nanofibers Prepared Tempo-Mediated Oxidation," Biomacromolecules, 10, 162-165, 2009, 4 pp.
European Search Report dated Nov. 5, 2015 corresponding to European Patent Application No. 12868878.5; 5 pages.

* cited by examiner

POROUS BODY AND PROCESS FOR MANUFACTURING SAME

CROSS REFERENCE TO RELATED APPLICATIONS

This application is a divisional of U.S. patent application Ser. No. 14/377,902 filed Nov. 20, 2014, which is a national stage application, filed under 35 U.S.C. § 371, of International Patent Application No. PCT/USJP2012/053549, filed on Feb. 15, 2012, each of which is incorporated by reference herein in its entirety.

TECHNICAL FIELD

The present invention relates to a porous body containing cellulose-based nanofibers.

BACKGROUND ART

In the progress of the industrial utilization of nanotechnologies, a technology for utilizing nanofibers, which is one of them, has significantly progressed in recent years. It is generally considered that nanofibers have a number average fiber diameter in the range from 1 to 100 nm. However, under the current situation, in the technologies for manufacturing nanofibers including electrospinning, the number average fiber diameter thereof exceeds 100 nm in many cases. In such technical trend, the present inventors have considered with respect to the utilization of cellulose-based nanofibers having a number average fiber diameter of from 1 to 100 nm.

In this description, the cellulose-based nanofibers refer to (1) microfine cellulose nanofibers (cellulose fibers) or (2) chemically-treated (modified) microfine cellulose nanofibers, which has a number average fiber diameter of from 1 to 100 nm. Examples of the cellulose nanofibers of (1) include microfibrillated cellulose (hereinafter abbreviated as MFC) having a number average fiber diameter of 100 nm or less, which is formed by shearing and fibrillating cellulose fibers under a high pressure, or bacteria cellulose (hereinafter abbreviated as BC) having a fine net structure and a number average fiber diameter of 100 nm or less, which is generated by a microorganism. Examples of the modified cellulose nanofibers of (2) include cellulose nanowhisker (hereinafter abbreviated as CNW) obtained by treating natural cellulose with 40% or more concentrated sulfuric acid, or microfine cellulose fibers being ultrafine and having homogeneous fiber diameters, which is formed by isolating microfibrils having a number average fiber diameter of about 3 to 5 nm constituting wood pulp as an aqueous dispersion body, by a mild chemical treatment and a slight mechanical treatment at an ordinary temperature and an ordinary pressure (for example, see Patent Literature 1).

Since cellulose-based nanofibers are derived from plants or organisms, they are advantageous in that the load on environments during manufacturing and disposing is smaller than those of nanofibers formed of thermoplastic polymers derived from petroleum. Accordingly, it is expected that a porous body is formed by using cellulose-based nanofibers, and the porous body is applied to various fields and applications such as functional filters, wiping materials, materials for electronic devices and recycled medical materials.

As a process for forming a porous body using nanofibers, for example, a technique for obtaining a non-woven fabric by forming a dispersion liquid in which microfine cellulose fibers (cellulose-based nanofibers) is dispersed in water or an organic solvent, or a mixed solvent thereof is formed into a film by an application process or a papermaking process is disclosed (for example, see Patent Literature 2). However, due to the flocculation force possessed by cellulose-based nanofibers, a dried body obtained by drying an aqueous dispersion of the cellulose-based nanofibers becomes a film having a high gas barrier property (for example, see Patent Literature 3 or Non-patent Literature 1). Patent Literature 2 discloses that a non-woven fabric having a higher porosity can be obtained as compared to the case when water is used as a dispersion medium, by using a hydrophobic organic solvent as a dispersion medium in an application process, as a means for obtaining a porous body having a fluid permeance for a gas or a liquid. Furthermore, the document discloses that, in a papermaking process, a non-woven fabric having a higher porosity than that of a non-woven fabric obtained by using water as a dispersion medium and directly subjecting to thermal drying, by replacing the dispersion medium from water to an organic solvent and then conducting drying.

A process for manufacturing a nanofiber structural body in which nanofibers are adhering to a support in a net-like form, by attaching a dispersion liquid of nanofibers formed of a thermoplastic polymer to the support, and subjecting the dispersion medium to natural drying or thermal drying, is disclosed (for example, see Patent Literature 4). Furthermore, a porous body having higher collection efficiency and air permeance of microparticles in which nanofibers form three-dimensional net structures in pores of a support, by attaching a dispersion liquid of nanofibers to the support, and freeze-drying the dispersion medium, and a process for manufacturing the porous body are disclosed (for example, see Patent Literature 5).

Furthermore, in a process for manufacturing a microfine fiber-like cellulose sheet, as a process for solving a phenomenon that the microfine fiber-like cellulose becomes difficult to be dehydrated by being highly-densified during aspiration filtration, a technique of incorporating a cellulose coagulant in the microfine fiber-like cellulose to allow easy dehydration, since the microfine fiber-like cellulose forms a network, and the network maintains airspaces included in the network without crush of the network by the pressure of the aspiration filter, is disclosed (for example, see Patent Literature 6).

CITATION LIST

Patent Literature

Patent Literature 1: JP 2008-1728 A
Patent Literature 2: WO 2006/004012 A
Patent Literature 3: JP 2009-57552 A
Patent Literature 4: JP 2005-330639 A
Patent Literature 5: JP 2008-101315 A
Patent Literature 6: JP 2010-168716 A

Non-Patent Literature

Non-patent Literature 1: Biomacromolecules, 10, 162-165 (2009)

SUMMARY OF INVENTION

Technical Problem

As mentioned above, the development of a porous body using cellulose-based nanofibers having fluid permeance, which can be manufactured on a large scale at low cost is desired from the viewpoint of the expansion of the application and development of cellulose-based nanofibers. However, under the current situation, there is no process by which a porous body using cellulose-based nanofibers having fluid permeance can be manufactured on a large scale at low cost.

In the cellulose-based nanofibers having a number average fiber diameter of several nanometers described in Patent Literature 1, a part or the entirety of the hydroxyl groups at the C6 positions of the cellulose molecules on the surfaces of the fibers have been substituted with carboxyl groups, which have higher hydrophilicity than that of hydroxyl groups. Furthermore, in general, since surface free energy per unit mass increases more at a thinner fiber diameter, the flocculation force among the fibers those stabilize the surface during the drying increases. Accordingly, if the aqueous dispersion of cellulose-based nanofibers described in Patent Literature 1 is directly dried, the cellulose-based nanofibers flocculate due to the hydrophilicity derived from the hydroxyl groups and carboxyl groups of the cellulose and the strong surface tension force possessed by water, and thus it is difficult to obtain a porous body having a net structure.

In a process using an organic solvent as a dispersion medium, including Patent Literature 2, and a process including substituting a dispersion medium with an organic solvent and then conducting drying, when an operation at an industry level is taken into consideration, special consideration must be required in view of environments. There are problems that high costs are inevitably required from the viewpoints of environments and equipment, including that the whole amount of the used organic solvent should be collected, response by equipment to handling of a flammable liquid, consideration on the health of workers, and the like.

Patent Literature 4 discloses a process for manufacturing a nanofiber structural body in which nanofibers formed of a thermoplastic polymer is attached in a net-like form to a support, but since nanofibers formed of a thermoplastic polymer and cellulose-based nanofibers are different in surface states, the means for dispersing cellulose-based nanofibers in a dispersion medium is different from the means for dispersing nanofibers formed of a thermoplastic polymer in a dispersion medium. In freeze drying including Patent Literature 5, the cost is high since a pressure reducing apparatus is necessary and thus continuous manufacture is impossible, consumption of energy is much as compared to that in thermal drying, a long time is required for the sublimation of the dispersion medium, and the like. Patent Literature 6 discloses a process of efficiently manufacturing a microfine fiber-like cellulose sheet by utilizing formation of a network by the microfine fiber-like cellulose, but the microfine fiber-like cellulose sheet that can be obtained by drying is not a porous body.

The object of the present invention is to provide a porous body having fluid permeance, which contains cellulose-based nanofibers having an extremely thin fiber diameter and high hydrophilicity, and to manufacture a porous body at low cost.

Solution to Problem

The present inventors considered many times so as to solve the above-mentioned problem, and consequently completed the present invention. Specifically, they found that a porous body having a structure in which a net constituted by cellulose-based nanofibers is formed throughout the structure can be obtained by disposing cellulose-based nanofibers having a number average fiber diameter of from 1 to 100 nm inside of pores of a support of a porous material in which many pores are connecting with one another. Furthermore, the present inventors found that a porous body can be obtained by a manufacturing process in which a nanofiber-dispersion liquid in which cellulose-based nanofibers having a number average fiber diameter of from 1 to 100 nm are dispersed in a dispersion medium is dried in a state that the nanofiber-dispersion liquid is attached to a porous support in which many pores are connecting with one another to thereby remove the dispersion medium.

The porous body according to the present invention is a porous body in which nanofibers are entangled to form net-like structural bodies in pores of a support of a porous material having many pores that are connecting with one another, wherein the nanofibers are cellulose-based nanofibers, and have a number average fiber diameter of from 1 to 100 nm. In the porous body according to the present invention, it is preferable that the above-mentioned net-like structural bodies have a number average pore diameter of from 10 to 200 nm. The surface area can be extended more.

In the porous body according to the present invention, it is preferable that the above-mentioned support has an average fine pore diameter of from 0.01 to 20 μm. Since the cellulose-based nanofibers easily form the net-like nanofiber structural bodies in the pores of the support, and the flocculation force that generates against the nanofibers during the drying can be dispersed, the net-like structures can also be maintained after the drying.

In the porous body according to the present invention, it is preferable that the above-mentioned support is either one of a porous film or a fiber sheet. The cellulose-based nanofibers easily form the net-like nanofiber structural bodies in the pores of the support, and the net-like structures can also be maintained after the drying.

In the porous body according to the present invention, it is preferable that the above-mentioned net-like structural bodies contain a surfactant, and the content of the surfactant is from 0.10 to 100% by mass in terms of solid content concentration with respect to the dry mass of the nanofibers. The flocculation of the cellulose-based nanofibers can be weakened during the drying, whereby the net-like structure can be maintained.

In the porous body according to the present invention, it is preferable that the above-mentioned surfactant is a cationic surfactant. Since the cationic surfactant is easily adsorbed on the surfaces of the cellulose-based nanofibers, the effect of weakening the flocculation of the cellulose-based nanofibers during the drying is further improved.

The process for manufacturing a porous body according to the present invention includes a step of preparing a dispersion liquid, in which a dispersion liquid that cellulose-based nanofibers having a number average fiber diameter of from 1 to 100 nm are dispersed in a dispersion medium is prepared, a step of attaching, in which the dispersion liquid is attached to a porous support having many pores that are connecting with one another, and a step of drying, in which the support is dried to remove the dispersion medium.

In the process for manufacturing a porous body according to the present invention, the above-mentioned dispersion medium is preferably water. Water is further excellent in view of safeness, environments and equipment.

In the process for manufacturing a porous body according to the present invention, it is preferable that the above-mentioned dispersion liquid contains the nanofibers by from 0.001 to 0.500% by mass in terms of solid content concentration with respect to the total mass of the above-mentioned dispersion liquid. The net-like structural body of the nanofibers can be efficiently formed in the pores of the support.

In the process for manufacturing a porous body according to the present invention, it is preferable that the above-mentioned dispersion liquid further contains a surfactant, and contains the surfactant by from 0.0001 to 1.0000% by mass in terms of solid content concentration with respect to the total mass of the above-mentioned dispersion liquid. The flocculation of the cellulose-based nanofibers can be weakened during the drying, thereby the net-like structure can be maintained.

Effect of the Invention

The present invention can provide a porous body having fluid permeance, which contains cellulose-based nanofibers having an extremely thin fiber diameter and high hydrophilicity, and can manufacture a porous body at low cost. Furthermore, since the porous body according to the present invention is such that nanofibers are entangled to form net-like structural bodies in the pores of a support of a porous material in which many pores are connecting with one another, the surface area can be extended.

DESCRIPTION OF EMBODIMENTS

Next, the present invention will be explained in detail with referring to exemplary embodiments, but the present invention is not interpreted by limiting to those descriptions. The exemplary embodiments may be modified in various ways as long as the effect of the present invention is exerted.

The porous body according to this exemplary embodiment is a porous body in which nanofibers are entangled to form net-like structural bodies in pores of a porous support having many pores that are connecting with one another, wherein the nanofibers are cellulose-based nanofibers, and have a number average fiber diameter of from 1 to 100 nm.

Cellulose-Based Nanofibers

In this exemplary embodiment, the cellulose-based nanofibers encompass cellulose nanofibers or chemically-treated (modified) cellulose nanofibers. In the cellulose-based nanofibers, cellulose molecules form a bundle of two or more pieces of cellulose molecules. That a bundle of two or more pieces of cellulose molecules is formed means a state in which two or more pieces of cellulose molecules gather to form an aggregate called as a microfibril. In this exemplary embodiment, the cellulose molecules include forms substituted with other functional groups such as cellulose molecules in which a part or the entirety of the hydroxyl groups on the C6 positions in the molecules have been oxidized into aldehyde groups, carboxyl groups or the like, cellulose molecules in which a part or the entirety of the hydroxyl groups including the hydroxyl groups on other than the C6 positions have been esterified to nitrate esters, acetate esters or the like, or cellulose molecules which etherated to methyl ethers, hydroxypropyl ethers, carboxymethyl ethers or the like.

The number average fiber diameter of the cellulose-based nanofibers is within the range from 1 to 100 nm. The number average fiber diameter of the nanofibers is more preferably from 1.5 to 50 nm, and especially preferably from 2 to 10 nm. When the number average fiber diameter is lower than 1 nm, the single fiber strength of the nanofibers is weak, and thus net-like structural bodies cannot be formed. When the number average fiber diameter is more than 100 nm, it is difficult to form net-like structural bodies in the pores of the support. The number average fiber diameter used herein is calculated according to the following way. The cellulose-based nanofibers are casted on a carbon film-coated grid, and observed by an electron microscopic image by using a transmission electron microscope (TEM, Transmission Electron Microscope). Two random axises are respectively drawn in longitudinal and transverse directions per one image on the obtained observation images, and the fiber diameters of the fibers intersecting with the axises are read by visual observation. At this time, the observation is conducted at either of magnifications of 5,000 times, 10,000 times and 50,000 times depending on the sizes of the constitutional fibers. The sample or magnification is under a condition in which 20 or more pieces of fibers are intersecting with the axises. By this way, at least three images of the surface parts that are not superposed are photographed by the electron microscope, and the values of the fiber diameters of the fibers that are respectively intersecting with two axises are read out. Accordingly, information on at least 20 pieces×2×3=120 pieces of fibers can be obtained. The number average fiber diameter was calculated from the thus-obtained data of fiber diameters.

The nanofibers are dispersed in the dispersion medium. The form of the nanofibers in the dispersion liquid is, for example, a form in which the nanofibers are dispersed in an unbound form, or a form in which the nanofibers are partially flocculated. The number average fiber length of the nanofibers is preferably from 0.05 to 20 μm. More preferably, the number average fiber length is from 0.10 to 10 μm. If the number average fiber length is lower than 0.05 μm, the nanofibers become close to particles, and thus become difficult to form net-like structural bodies. If the number average fiber length exceeds 20 μm, the nanofibers are frequently entangled with one another, and thus flocculated bodies may be formed. The number average fiber length is calculated by thinly casting a cellulose-based nanofiber-dispersion liquid on a substrate and freeze-drying the dispersion liquid, and observing an electron microscope image by using a scanning electron microscope (SEM, Scanning Electron Microscope). For the obtained observation images, ten independent fibers are randomly selected per one image, and the fiber lengths thereof are read out by visual observation. At this time, the observation is conducted at either of magnifications of 5,000 times or 10,000 times depending on the lengths of the constitutional fibers. The subject of the sample or magnification is one in which the starting points and ending points of the fibers are present in the same image. By this way, at least 12 images of the surface parts that are not superposed are photographed by the SEM, and the fiber lengths are read out. Accordingly, information on at least 10 pieces×12=120 pieces of fibers can be obtained. By this way, the number average fiber length can be calculated from the obtained data of fiber diameters. The cross-sectional shape of the nanofibers is, for example, a circular shape, an oval shape, a planular shape, a square shape, a triangle shape or a rhombic shape. Among these, a square shape is preferable. This exemplary embodiment is not limited by the number average fiber length and cross-sectional shape of the nanofibers.

The kinds of the nanofibers are, for example, the above-mentioned MFC, BC, CNW, or the cellulose-based nanofibers described in Patent Literature 1. MFC is characterized by having a broad distribution of fiber diameters since MFC is obtained by shearing cellulose fibers by a mechanical treatment to form nanofibers. BC is characterized by having relatively homogeneous fiber diameters. CNW is characterized by having relatively homogeneous fiber diameters but short fiber lengths of from 0.1 to 0.2 As described in Patent Literature 1, the cellulose-based nanofibers described in Patent Literature 1 has a characteristic that the nanofibers are manufactured as an aqueous dispersion by oxidizing a cellulose-based raw material by using an oxidizing agent in the presence of a mixture of an N-oxyl compound, a bromide, an iodide, or a mixture thereof, and defibrating the oxidized cellulose by further subjecting it to a wet micronization treatment, and that the nanofibers have homogeneous fiber diameters.

Among these, the microfine cellulose described in Patent Literature 1 is especially preferable in that the energy required for the manufacture is smaller than those required for the other cellulose fibers, and that the producibility is high.

The cellulose-based nanofibers described in Patent Literature 1 are cellulose single microfibrils. In natural cellulose, microfibrils are formed into many bundles to thereby constitute a high order of individual structure. Here, the microfibrils strongly flocculate by the hydrogen bonds derived from the hydroxyl groups in the cellulose molecules. The cellulose single microfibrils refer to microfibrils obtained by subjecting natural cellulose to a chemical treatment and a slight mechanical treatment, and conducting isolation. In the cellulose-based nanofibers described in Patent Literature 1, a part of the hydroxyl groups in the cellulose molecules have been oxidized to at least one functional group selected from the group consisting of a carboxyl group and an aldehyde group, and has a cellulose type I crystal structure. The largest fiber diameter is 1,000 nm or less. When the cellulose-based nanofibers are dispersed in water, a transparent liquid is formed.

The cellulose raw material as the raw material of the cellulose-based nanofibers is not especially limited, and for example, kraft pulps derived from various wood materials such as broad-leaved tree breached kraft pulp (LBKP) and needle-leaved tree breached kraft pulp (NBKP); sulfite pulp; waste paper pulps such as deinking pulp (DIP); mechanical pulps such as ground pulp (GP), pressurized ground pulp (PGW), refiner ground pulp (RMP), thermomechanical pulp (TMP), chemithermomechanical pulp (CTMP), chemimechanical pulp (CMP) and chemiground pulp (CGP); powdery celluloses obtained by pulverizing those pulps by a high pressure homogenizer, a mill or the like; microcrystalline cellulose powders obtained by purifying those pulps by a chemical treatment such as acid hydrolysis can be used. Furthermore, plants such as kenaf, hemp, rice, bagasse, bamboo and cotton can also be used. This exemplary embodiment is not limited by the raw material and manufacturing process of the nanofibers.

The process for manufacturing the nanofibers is, for example, the manufacturing process described in Patent Literature 1. According to Patent Literature 1, the process for manufacturing nanofibers uses natural cellulose as a raw material, and includes a step of an oxidation reaction in which the natural cellulose is oxidized by reacting with a cooxidizing agent by using an N-oxyl compound as an oxidation catalyst in water, to give reactant fibers, a step of purification in which impurities are removed to give reactant fibers impregnated with water, a step of dispersion in which the reactant fibers impregnated with water are dispersed in a dispersion medium, and a step of drying in which the dispersion medium is dried from the dispersed body obtained in the step of dispersion.

In the step of an oxidation reaction, a dispersion liquid in which natural cellulose is dispersed in water is prepared. The dispersion medium for the natural cellulose in the reaction is water. Furthermore, the concentration of the natural cellulose in the reaction aqueous solution is arbitrary as long as it is a concentration that allows sufficient diffusion of the reagents, and is generally 5% by mass or less with respect to the mass of the reaction aqueous solution.

Many N-oxyl compounds that can be used as oxidation catalysts for cellulose have been reported (the article titled as "Catalytic Oxidation of Cellulose Using TEMPO Derivative: HPSEC and NMR Analyses of Oxidized Product" by I. Shibata and A. Isogai, "Cellulose" Vol. 10, 2003, pages 335 to 341). Among these, TEMPO, 4-acetamide-TEMPO, 4-carboxy-TEMPO and 4-phosphonooxy-TEMPO are especially preferable in the reaction velocities in water at ordinary temperature. It is sufficient to add these N-oxyl compounds by catalytic amounts. Specifically, the N-oxyl compounds are added to the reaction aqueous solution by preferably in the range from 0.1 to 4 mmol/l, further preferably in the range from 0.2 to 2 mmol/l. If the amount is lower than 0.1 mmol/l, the catalyst effect may be poor. If the amount exceeds 4 mmol/l, the N-oxyl compound may not be dissolved in water.

The cooxidizing agent is, for example, hypohalous acids or salts thereof, halous acids or salts thereof, perhalogenic acids or salts thereof, hydrogen peroxide and perorganic acids. Alkali metal salts of hypohalous acids are preferable. The alkali metal salts of hypohalous acids are, for example, sodium hypochlorite and sodium hypobromite. In the case when sodium hypochlorite is used, it is preferable to promote the reaction in the presence of an alkali metal bromide such as sodium bromide in view of reaction velocity. The addition amount of this alkali metal bromide is preferably from 1 to 40-fold molar amount with respect to the N-oxyl compound. More preferably, the addition amount is from 10 to 20-fold molar amount. If the addition amount is lower than 1-fold molar amount, the reaction velocity may be poor. If the addition amount exceeds 40-fold molar amount, the reaction velocity may be poor. The pH of the reaction aqueous solution is preferably maintained at a range from 8 to 11. The temperature of the aqueous solution is arbitrary at from 4 to 40° C., but the reaction can be conducted at room temperature and does not especially require the control of the temperature. The addition amount of the cooxidizing agent is preferably in the range from 0.5 to 8 mmol with respect to 1 g of the natural cellulose. The reaction is conducted for preferably from 5 to 120 minutes, and is completed within a maximum of 240 minutes.

The step of purification is a step in which purification is conducted by removing impurities such as unreacted hypochlorous acid and various by-products from the oxidized cellulose slurry obtained in the step of an oxidation reaction. In the stage at which the step of an oxidation reaction has been conducted, the natural cellulose are generally not dispersed to nanofiber units in an unbound state, and thus general purification processes, i.e., a step of washing with water and a step of filtering are repeated to thereby give a purified oxidized cellulose slurry with a high purity (99% by mass or more). The concentration of the thus-obtained purified oxidized cellulose slurry is preferably in the range from 10 to 50% by mass in terms of solid content (cellulose) concentration in a squeezed state. More preferably, the concentration is 15 to 30% by mass. Considering the step of dispersion, which will be conducted later, a solid content concentration higher than 50% by mass is not preferable since extremely high energy is required for the dispersion.

The step of dispersion is a step for obtaining a cellulose-based nanofiber-dispersion liquid by further dispersing the oxidized cellulose slurry obtained in the step of purification in a dispersion medium. As the dispersion medium, dispersion media that will be exemplified as dispersion media that can be used in the after-mentioned step of preparing a dispersion liquid in the process for manufacturing a porous body can be used. As the dispersing machine, a general-purpose dispersing machine as an industrial manufacturing machine can be used. The general-purpose dispersing machine is for example, a screw type mixer, a paddle mixer, a disper type mixer and a turbine type mixer. Furthermore, more efficient and advanced downsizing are possible by using an apparatus that is stronger and having more beating ability such as a homomixer under high-speed rotation, a high pressure homogenizer, an ultra-high pressure homogenizer, an ultrasonic dispersion treatment, a beater, a disk type refiner, a conical type refiner, a double-disk type refiner or a grinder.

The step of drying is a step in which microfine cellulose fibers are separated by drying the cellulose-based nanofiber-dispersion liquid obtained in the step of dispersion to remove the dispersion medium. The drying process is, for example, in the case when the dispersion medium for the dispersed body is water, the step is a freeze drying process, and in the case when the dispersion medium for the dispersed body is a mixed solution of water and an organic solvent, the step is drying by a drum dryer, or spray drying by a spray dryer.

Porous Support

In this exemplary embodiment, the support is a porous support in which many pores are connecting with one another. The pores of the support as used herein encompass either of microfine pores that are regularly formed, or airspaces among the fibers formed by the entanglement of the fibers. That the pores are connecting with one another refers to a state in which airspaces are continuously connected in a straight line or curve form from one surface to other surface. The support is not especially limited as long as it is a porous material in which many pores are connecting with one another, and examples are fiber sheets obtained by processing fibers into a sheet-like form such as non-woven fabrics, papers, woven fabrics and knit fabrics, porous materials in which many airspaces are connecting with one another such as porous films, porous ceramics and sponges, or composites thereof. The fiber sheets are, for example, inorganic fiber sheets, chemical fiber sheets, natural fiber sheets or metal fiber sheets. The inorganic fiber sheets are, for example, glass fiber sheets or carbon fiber sheets. The chemical fiber sheets are, for example, recycled fiber sheets using cellulose as a raw material such as rayon, cupra and Tencel, semi-synthesized fiber sheets using cellulose that has undergone a chemical treatment as a raw material such as acetate, synthetic fiber (organic fiber) sheets using thermoplastic resins as a raw material such as polyamides, vinylons, polyesters, polyvinylidene chloride, acrylics, polyolefins and aramides. The natural fiber sheets are, for example, plant fiber sheets of cotton, hemp, linen and the like, or animal fiber sheets of wool, silk, cashmere and the like. The metal fiber sheets are, for example, stainless, iron, gold, silver or aluminum. The porous films are, for example, membrane filters.

In the porous body according to this exemplary embodiment, it is preferable that the support has an average fine pore diameter of from 0.1 to 20 μm. More preferably, the average fine pore diameter is from 0.5 to 10 μm. At lower than 0.1 μm, the fluid permeance is poor in some cases. At more than 20 μm, the cellulose-based nanofibers become difficult to homogeneously form net-like structural bodies in the pores of the support in some cases. Here, the average fine pore diameter is a value measured according to ASTM E1294-89 "Half-Dry Process".

It is preferable that the support has an air resistance (Oken) measured according to JIS P 8117: 2009 "Paper and Board-Determination of Air Permeance And Air Resistance (Medium Range)—Gurley Method" of 10,000 s or less. More preferably, the air resistance is 100 s or less. At more than 10,000 s, the fluid permeance of the porous body decreases in some cases.

In the case when the dispersion medium for the nanofibers is water, it is desirable that the support is hydrophilic. If the support is hydrophobic, the dispersion liquid becomes difficult to penetrate the inside. In the porous body according to this exemplary embodiment, it is preferable that the support is either one of a porous film or a fiber sheet. Since a porous film or fiber sheet allow to select pores of the support different in shape and size easily, the amount and velocity of the dispersion liquid that penetrates the inside of the pores of the support can be controlled, and more homogeneous net-like nanofiber structural bodies are easily formed inside of the pores of the support, and the net-like structures can also be maintained after the drying.

The porous film has microfine pores of various shapes as the pores. The material of the porous film is not especially limited in this exemplary embodiment, and examples are cellulose, cellulose mixed esters, cellulose acetate, polyethylenes, polypropylenes, polyurethanes, polystyrenes, polyesters or polycarbonates. A polycarbonate membrane filter is more preferable in that the pore diameters are homogeneous. The average fine pore diameter of the porous film is preferably from 0.1 to 20 μm. More preferably, the average fine pore diameter is from 0.5 to 10 μm. At lower than 0.1 μm, the fluid permeance is poor in some cases. At greater than 20 μm, the cellulose-based nanofibers are difficult to homogeneously form net-like structural bodies in the pores of the support in some cases.

The fiber sheet has airspaces among fibers, which are formed by the entanglements of the fibers, as pores. The material of the fiber sheet is not especially limited in this exemplary embodiment, and glass fibers are more preferable in that a fiber sheet material having a smaller pore diameter is formed without decreasing the fluid permeance. The average fine pore diameter of the fiber sheet is preferably from 0.1 to 20 μm. More preferably, the average fine pore diameter is from 0.5 to 10 μm. At lower than 0.1 μm, the fluid permeance is poor in some cases. At more than 20 μm, the cellulose-based nanofibers are difficult to homogeneously form net-like structural bodies in the pores of the support.

The fabric weight of the fiber sheet is preferably from 10 to 1,000 g/m$^2$. More preferably, the fabric weight is from 40 to 200 g/m$^2$. At lower than 10 g/m$^2$, the physical strength is insufficient in some cases. At more than 1,000 g/m.sup.2, the fluid air permeance is poor in some cases.

Surfactant

In the porous body according to this exemplary embodiment, it is preferable that the net-like structural bodies contain a surfactant, and the content of the surfactant is from 0.10 to 100% by mass in terms of solid content concentration with respect to the dry mass of the nanofibers. More preferably, the content is from 0.5 to 50.0% by mass. Especially preferably, the content is from 1 to 40% by mass. At lower than 0.10% by mass, the effect of addition of the surfactant cannot be obtained in some cases. At more than 100% by mass, the cellulose-based nanofibers become difficult to maintain the fiber state in some cases.

In this exemplary embodiment, a cationic surfactant, an anionic surfactant, a nonionic surfactant or an amphoteric surfactant can be used as the surfactant. In the porous body according to this exemplary embodiment, the surfactant is preferably a cationic surfactant. Since the surfaces of the cellulose-based nanofibers show anionic property, the cationic surfactant is easily adsorbed by the surfaces of the nanofibers, and thus the effect of weakening the flocculation of the cellulose-based nanofibers during the drying is further enhanced. The cationic surfactant is, for example, quaternary ammonium salts, alkylamine salts, sulfonium salts or phosphonium salts. Quaternary ammonium salts are more preferable in that they have high solubility in water. The surfactant has an effect of decreasing the surface tension of the liquid and a hydrophibization effect by that the hydrophilic site of the surfactant is adsorbed by the cellulose-based nanofibers, and thus the hydrophobic site is directed to outside, therefore, the surfactant is considered to have a function to weakened the flocculation of the cellulose-based nanofibers during the drying.

It is preferable that the porous body according to this exemplary embodiment has an air resistance (Oken) measured according to JIS P 8117: 2009 "Paper and Board—Determination of Air Permeance And Air Resistance (Medium Range)—Gurley Method" of 10,000 s or less. More preferably, the air resistance is 100 s or less. At more than 10,000 s, the fluid permeance is poor in some cases.

In the porous body according to this exemplary embodiment, it is the preferable that the net-like structural bodies have a number average pore diameter of from 10 to 200 nm. More preferably, the number average pore diameter is from 20 to 150 nm. At lower than 10 nm, the area of the open-pore part decreases, and thus the fluid permeance is poor in some cases. At more than 200 nm, the entanglements of the cellulose-based nanofibers decreases, and thus it is difficult to say that net-like structures in which the surface area is effectively enlarged are formed. Here, the pores of the net-like structural bodies refer to airspaces among the nanofibers formed by the entanglement of the nanofibers with one another in the pores of the support. The number average pore diameter of the net-like structural bodies is read out from an electron microscopic image of the surface of the porous body obtained by using a SEM (hereinafter referred to as a SEM image). At this time, the observation is conducted at any of magnifications from 10,000 to 50,000 times depending on the size of the pores of the constitutional net-like structural bodies. A square region in which 20 or more pores of the net-like structural bodies are included is selected from the obtained SEM image (the pores of the net-like structural bodies that are in contact with the outer frame of the square are not included in the number), and the areas of all of the pores of the net-like structural bodies that are within the square and are not in contact with the outer frame are obtained, converted to true circles and calculated. This operation is conducted on arbitrary five portions. Accordingly, information on at least 20×5=100 pore diameters can be obtained. By this way, the number average pore diameter was calculated from the thus-obtained data of the pore diameters. The pores having a diameter at the measurement limit or less (for example, 5 nm or less) were out of the measurement.

In the porous body according to this exemplary embodiment, the net formation rate is preferably 10% or more. More preferably, the net formation rate is 50% or more. At lower than 10%, the effect by the formation of the net-like structural bodies is poor in some cases. Here, the net formation rate was obtained by selecting an arbitrary area of 10 μm×10 μm from an electron microscopic image of the surface of the porous body obtained by using a SEM, and calculating the ratio of the number of the pores in which the net-like structural bodies were formed to the number of the pores that were present therein. This operation was conducted on arbitrary five portions, and an average value was obtained.

It is preferable that the porous body according to this exemplary embodiment has an open pore rate of from 10 to 99%. More preferably, the open pore rate is from 50 to 90%. At lower than 10%, the fluid permeance is poor in some cases. At more than 99%, the physical strength is weakened in some cases. Here, the open pore rate was obtained by selecting an arbitrary area of 5 μm×5 μm from an electron microscopic image of the surface of the porous body obtained by using a SEM, and calculating the ratio of the total area of the unoccluded parts that accounts for the entirety of the pores in the pores in which net-like structural bodies were formed present therein. This operation was conducted on arbitrary ten portions, and an average value was obtained.

The process for manufacturing a porous body according to this exemplary embodiment has a step of preparing a dispersion liquid, in which a dispersion liquid that cellulose-based nanofibers having a number average fiber diameter of from 1 to 100 nm are dispersed in a dispersion medium is prepared, a step of attaching, in which the dispersion liquid is attached to a porous support having many pores are connecting with one another, and a step of drying, in which the support is dried to remove the dispersion medium.

Step of Preparing Dispersion Liquid

Firstly, a dispersion liquid of nanofibers in which cellulose-based nanofibers are dispersed in a dispersion medium is prepared. In the preparation of the dispersion liquid, the dispersion liquid having a desired concentration may be obtained by diluting the cellulose-based nanofiber-dispersion liquid, or the dispersion liquid may be obtained by adding the cellulose-based nanofibers to the dispersion medium so as to give a desired concentration. Here, the cellulose-based nanofiber-dispersion liquid is, for example, a cellulose-based nanofiber-dispersion liquid obtained in the step of dispersing in the process for manufacturing cellulose-based nanofibers described in the above-mentioned Patent Literature 1, and whether the dispersion liquid is manufactured, or a commercially available product is utilized, is not questioned. The cellulose-based nanofibers are, for example, cellulose-based nanofibers separated from a dispersion medium obtained in the step of drying in the process for manufacturing cellulose-based nanofibers described in the above-mentioned Patent Literature 1, and whether the nanofibers are manufactured, or a commercially available product is utilized, is not questioned. The process of diluting the nanofiber-dispersion liquid is more preferable in that the flocculation of the nanofibers is small, and that the nanofibers have homogeneous fiber diameters. In this exemplary embodiment, the step is not limited to the process of diluting the cellulose-based nanofiber-dispersion liquid or the process of dispersing the cellulose-based nanofibers in the dispersion medium, and for example, the dispersion liquid can be formed by a known dispersing machine such as a screw type mixer, a paddle type mixer, a disper type mixer or a turbine type mixer. Furthermore, a dispersion liquid of further refined nanofibers can be obtained by using an apparatus having a strong beating ability such as a homomixer under high-speed rotation, a high pressure homogenizer, an ultrasonic dispersion treatment, a beater, a disk type refiner, a conical type refiner, a double-disk type refiner or a grinder.

It is preferable that the dispersion liquid contains nanofibers from 0.001 to 0.500% by mass in terms of solid content concentration with respect to the total mass of the dispersion liquid. The solid content concentration is more preferably from 0.010 to 0.100% by mass, especially preferably from 0.03 to 0.100% by mass. At lower than 0.001% by mass, the net-like structural bodies are not formed in the pores of the support in some cases. At higher than 0.500% by mass, the nanofibers are stacked during the drying to form a film having no air permeance in some cases.

In this exemplary embodiment, the dispersion medium is preferably water from the viewpoints of safeness, environment and equipment. However, a hydrophilic organic solvent can be used as necessary. The hydrophilic organic solvent is, for example, alcohols such as methanol, ethanol, isopropanol, isobutanol, sec-butanol, tert-butanol, 2-methoxyethanol, 2-ethoxyethanol, ethylene glycol and glycerin, ethers such as ethylene glycol-dimethyl ether, 1,4-dioxane and tetrahydrofuran, ketones such as acetone and methyl ethyl ketone, N,N-dimethylformamide, N,N-dimethylacetamide or dimethylsulfoxide.

In this exemplary embodiment, it is preferable that the dispersion liquid further contains a surfactant, and contains the surfactant by from 0.0001 to 1.0000% by mass in terms of solid content concentration with respect to the total mass of the above-mentioned dispersion liquid. The solid content concentration is more preferably from 0.0010 to 0.1000% by mass, especially preferably from 0.0100 to 0.0500% by mass. By this way, an effect of suppressing the flocculation of the nanofibers can be obtained, and thus the flocculation of the cellulose-based nanofibers during the drying can be weakened, and net-like structures can be maintained in the pores of the support. At lower than 0.0001% by mass, the effect of the surfactant cannot be obtained in some cases. At more than 1.0000% by mass, the shape of the nanofibers cannot be maintained, and thus the net-like structural bodies cannot be formed in the pores of the support in some cases.

Step of Attaching

The process for attaching the dispersion liquid to the support is not limited in this exemplary embodiment, and examples are an impregnation process, an application process or a spraying process. The wet attached amount of the dispersion liquid is suitably adjusted depending on the thickness, material and average fine pore diameter of the support, and is preferably from 1 to 1,000 g/m.sup.2 per unit area of the support. The wet attached amount is more preferably from 10 to 500 g/m.sup.2. At lower than 1 g/m.sup.2, the dispersion liquid is not distributed throughout the support in some cases. At more than 1000 g/m.sup.2, the dispersion liquid is excessive, and the porous body is poor in fluid air permeance in some cases.

The impregnation process is, for example, a process in which the support is completely immersed in the dispersion liquid, or a process in which only the surface of the support is immersed. The process in which the support is completely immersed in the dispersion liquid allows efficient and assured permeation of the dispersion liquid to the deep parts in the pores of the support, and thus is excellent in that more homogeneous net-like structural bodies of nanofibers can be formed. Furthermore, the process is more effective for allowing the permeation of the dispersion liquid, since when the pressure is reduced while the support is completely immersed in the dispersion liquid, the air in the support easily comes out. In addition, it is preferable to remove the excessively attached dispersion liquid by squeezing with a roll dehydrator or the like, or by using water absorbing felt, water absorbing paper or the like. The process in which only the surface of the support is immersed is effective in the case when a density difference of the net-like structural bodies in the pore is provided in the thickness direction of the support.

The application process is a process in which the dispersion liquid is applied onto the surface of the support by a known applicator. The known applicator is, for example, an air knife coater, a roll coater, a bar coater, a comma coater, a blade coater or a curtain coater. The application process is excellent in that the amount of the dispersion liquid attached to the support is easily controlled.

The spraying process is a process in which the dispersion liquid is sprayed onto the surface of the support by using a known spraying apparatus such as an atomizer or a spray. The spraying process is effective, for example, in the case when the net-like structural bodies of the nanofibers are to be formed only in the pores near the surface among the pores of the support, or in the case when the thicknesses of the net-like structural bodies are desired to be thin.

Step of Drying

As the drying process, it is preferable to select forced drying by heat, reduced pressure or the like, or natural drying by leaving in the air. In the case of heat drying, the temperature should be a temperature at which the support and nanofibers do not undergo decomposition, deformation and the like. The drying temperature differs depending on the kinds of the support and nanofibers, and for example, the drying temperature is preferably from 20 to 120° C. in the case when a polycarbonate type membrane filter is used as the support, and the nanofibers described in Patent Literature 1 are used as the nanofibers. More preferably, the drying temperature is from 50 to 110° C. At lower than 20° C., the drying takes a long time, and thus is not efficient. At more than 120° C., the temperature goes beyond the softening point of the support, and thus the support may be deformed. Furthermore, in the case when glass fibers are used as the support, and the nanofibers described in Patent Literature 1 are used as the nanofibers, the temperature is preferably from 20 to 200° C. More preferably, the temperature is from 50 to 120° C. At lower than 20° C., the drying takes a long time, and thus is not efficient. At more than 200° C., the cellulose-based nanofibers may be decomposed by heat. In this exemplary embodiment, it is considered that the flocculation force that generates against the nanofibers is dispersed during the drying of the dispersion liquid by using the support of the porous material, and the nanofibers dispersed in the microthin films remain with maintaining the net-like structures even after the water has evaporated, by forming many microthin films in each pore of the support and then drying the microthin films.

In the process for manufacturing a porous body according to this exemplary embodiment, it is important that the dispersion liquid is homogeneously present in the pores of the support. In this exemplary embodiment, it is preferable that the dispersion medium in which the nanofibers are dispersed is water, and the support is a hydrophilic support. Furthermore, it is especially preferable to use the cellulose-based nanofibers of Patent Literature 1 as the nanofibers. Since the cellulose-based nanofibers have high hydrophilicity due to the hydrophilic functional groups in the molecules, a dispersion liquid in which the nanofibers are dispersed more homogeneously can be obtained by using water as the dispersion medium. Especially, in the cellulose-based nanofibers of Patent Literature 1, since a part of the hydroxyl groups in the molecules have been substituted with carboxyl groups, which have negative electrical charge, and a static repulsion force acts among the nanofibers, and thus a further homogeneous, stable dispersion liquid can be obtained. Furthermore, by making the support hydrophilic, the aqueous dispersion liquid of the nanofibers can be homogeneously present in the pores of the support, and consequently, the nanofibers can be homogeneously present in the pores of the support. Furthermore, by making the support hydrophilic, the microthin films of the nanofiber-dispersion liquid are stably formed, and thus a porous body in which the net-like structural bodies are homogeneously formed can be obtained even after the water has evaporated as the dispersion medium is removed by thermal drying or natural drying. By further incorporating the cationic surfactant in the dispersion liquid, the surface tension of the dispersion liquid decreases, and thus the wettability on the support can further be increased. Furthermore, the flocculation of the nanofibers during the drying can be weakened. On the other hand, in the porous body using a thermoplastic polymer as the nanofibers including Patent Literature 5, since the thermoplastic polymer is hydrophobic, it is difficult to homogeneously disperse the nanofibers in the microthin films.

EXAMPLES

Next, the present invention will be explained in more detail with referring to Examples, but the present invention is not limited by these Examples. Furthermore, unless otherwise mentioned, the "part(s)" and "%" in the Examples represent "part(s) by mass" and "% by mass", respectively.

Preparation of Nanofiber-Dispersion Liquid 1

NBKP (mainly formed of fibers having a fiber diameter of more than 1,000 nm) corresponding to 2.00 g in terms of dry weight, 0.025 g of TEMPO (2,2,6,6-tetramethylpiperidine-I-oxyradical) and 0.25 g of sodium bromide were dispersed in 150 ml of water, and a 13% aqueous solution of sodium hypochlorite was added to 1.00 g of pulp so that the amount of the sodium hypochlorite became 5.00 mmol to thereby initiate a reaction. During the reaction, a 0.50 mol/l aqueous solution of sodium hydroxide was added dropwise to thereby retain the pH at 10. After the reaction had been conducted for 2 hours, the reactant was filtered and sufficiently washed with water to give a slurry of oxidized cellulose. 0.15% by mass of the oxidized cellulose slurry was subjected to a fibrillation treatment by using a homogenizer (type NS-56, manufactured by Microtec Co., Ltd.) at 15,000 rpm for 8 minutes, and subsequently, a fibrillation treatment was conducted by an ultrasonic homogenizer (type US-300T, manufactured by Nissei Corporation) for 4 minutes. Furthermore, the coarse fibers were removed by centrifugation separation, the coarse fibers were then removed by transparent centrifugation separation, and a fibrillation treatment by an ultrasonic homogenizer (type US-300T, manufactured by Nissei Corporation) was further conducted for 4 minutes to give transparent and sticky cellulose-based nanofiber-dispersion liquid 1. As a result of an analysis of an observation image obtained by observing this nanofiber-dispersion liquid 1 by using a TEM at a magnification of 50,000 times, it was found that the number average fiber diameter was 4 nm, and the number average fiber length was 1.1 Rm.

Preparation of Nanofiber-Dispersion Liquid 2

Cellulose-based nanofibers aqueous dispersion liquid 2 was obtained in a similar manner to that for the nanofiber-dispersion liquid 1, except that LBKP (mainly formed of fibers having a fiber diameter of more than 1,000 nm) was used as a raw material. As a result of an analysis of an observation image obtained by observing this nanofiber-dispersion liquid 2 by using a TEM at a magnification of 50,000 times, it was consequently found that the number average fiber diameter was 4 nm, and the number average fiber length was 1.0 μm.

Example 1

[Step of Preparing Dispersion Liquid]

The nanofiber-dispersion liquid 1 was diluted so that the solid content concentration of the nanofibers became 0.050% with respect to the total mass of the dispersion liquid to give a dispersion liquid of the nanofibers. Cetyltrimethylammonium bromide (manufactured by Wako Pure Chemical Industries, Ltd.) as a cationic surfactant was added to the total mass of the dispersion liquid so as to be 0.010% mass in terms of solid content concentration. The total solid content concentration of the dispersion liquid was 0.060%.

Step of Attaching

As a porous support in which many pores are connecting with one another, a polycarbonate-type membrane filter having an average fine pore diameter of 0.8 μm (manufactured by ADVANTEC) was used, and the entirety of the support was immersed in the above-mentioned dispersion liquid. The excess dispersion liquid attached to the surface of the membrane filter after the immersion was removed by water absorbing paper. The difference in the support masses before and after the immersion in the dispersion liquid was calculated as an attached amount, and the attached amount was 10 g/m.sup.2.

Step of Drying

The support with the dispersion liquid attached thereto was dried by using a dryer under drying conditions of a drying temperature of 105° C. and a drying time of 5 minutes to give a porous body. Here, the content of the surfactant in the net-like structural bodies was 20% with respect to the dry mass of the nanofibers.

Example 2

A porous body was obtained in a similar manner to that of Example 1, except that the nanofiber-dispersion liquid 2 was used.

Example 3

A porous body was obtained in a similar manner to that of Example 1, except that the drying conditions were a drying temperature of 30° C. and a drying time of 1 hour in the step of drying in Example 1.

Example 4

A porous body was obtained in a similar manner to that of Example 1, except that the solid content concentration of the nanofibers was 0.010% with respect to the total mass of the dispersion liquid and the surfactant was 0.0020% in terms of solid content concentration with respect to the total mass of the dispersion liquid in the step of preparing a dispersion liquid in Example 1. Here, the amount of the dispersion liquid attached to the support was 10 g/m.sup.2, and the content of the surfactant in the net-like structural bodies was 20% with respect to the dry mass of the nanofibers.

Example 5

A porous body was obtained in a similar manner to that of Example 1, except that the solid content concentration of the nanofibers was 0.60% with respect to the total mass of the dispersion liquid and the surfactant was 0.12% in terms of solid content concentration with respect to the total mass of the dispersion liquid by concentrating the nanofiber-dispersion liquid 1 in the step of preparing a dispersion liquid in Example 1. Here, the amount of the dispersion liquid attached to the support was 10 g/m.sup.2, and the content of the surfactant in the net-like structural bodies was 20% with respect to the dry mass of the nanofibers.

Example 6

A dispersion liquid was attached to a support in a similar manner to that of Example 1, except that a glass fiber sheet having a fabric weight of 64 g/m.sup.2 and an average fine pore diameter of 2.7 µm was used as the support and the attached amount was 150 g/m.sup.2 in the step of attaching in Example 1. Furthermore, a porous body was obtained in a similar manner to that of Example 1, except that the drying conditions were a drying temperature of 105° C. and a drying time of 10 minutes in the drying step of Example 1. Here, the content of the surfactant in the net-like structural bodies was 20% with respect to the dry mass of the nanofibers.

Example 7

A dispersion liquid was attached to a support in a similar manner to that of Example 1, except that a glass fiber sheet having a fabric weight of 40 g/m.sup.2 and an average fine pore diameter of 15 µm was used as the support and the attached amount was 150 g/m.sup.2 in the step of attaching in Example 1. Furthermore, a porous body was obtained in a similar manner to that of Example 1, except that the drying conditions were a drying temperature of 105° C. and a drying time of 10 minutes in the step of drying of Example 1. Here, the content of the surfactant in the net-like structural bodies was 20% with respect to the dry mass of the nanofibers.

Example 8

A porous body was obtained in a similar manner to that of Example 1, except that a surfactant was not used in the step of preparing the dispersion liquid in Example 1. Here, the amount of the dispersion liquid attached to the support was 10 g/m.sup.2.

Example 9

In the step of preparing the dispersion liquid in Example 1, slurry-like MFC (Celish KY-100G, manufactured by Daicel Corporation) was used as nanofibers instead of the nanofiber-dispersion liquid 1. Here, the MFC was defiberized by a household mixer, and the coarse fibers were removed by centrifugation separation. As a result of an analysis of an observation image observed at a magnification of 10,000 times by using an electron microscope, it was found that the number average fiber diameter of the nanofibers was 64 nm, and the number average fiber length was 6.2 µm. Preparation was conducted so that the solid content concentration of the nanofiber-dispersion liquid became 0.150% with respect to the total mass of the dispersion liquid to give a dispersion liquid of the nanofibers. A porous body was obtained in a similar manner to that of Example 1, except that cetyltrimethylammonium bromide (manufactured by Wako Pure Chemical Industries, Ltd.) as a cationic surfactant was added to the dispersion liquid so as to be 0.030% in terms of solid content concentration with respect to the total mass of the dispersion liquid. The total solid content concentration of the dispersion liquid was 0.180%. Furthermore, the amount of the dispersion liquid attached to the support was 10 g/m.sup.2, and the content of the surfactant in the net-like structural bodies was 20% with respect to the dry mass of the nanofibers.

Comparative Example 1

The dispersion liquid obtained in the step of preparing a dispersion liquid in Example 1 was poured into a petri dish made of glass so that the fabric weight became 2 g/m.sup.2, and dried at a drying temperature of 105° C. and a drying time of 6 hours, whereby a transparent sheet was obtained.

Comparative Example 2

In the step of preparing the dispersion liquid in Example 1, slurry-like MFC (Celish KY-100G, manufactured by Daicel Corporation) was used as nanofibers instead of the nanofiber-dispersion liquid 1. A porous body was obtained in a similar manner to Example 9, except that a precipitated product obtained by defiberizing the MFC by a household mixer and removing the microfine fibers by centrifugation separation was used. As a result of an analysis of an observation image observed at a magnification of 5,000 times by using an electron microscope, it was found that the number average fiber diameter of the nanofibers was 430 nm. It was able to be confirmed that the number average fiber length of the nanofibers was more than 20 µm, but the full length was not able to be confirmed from the observation image. Furthermore, the amount of the dispersion liquid attached to the support was 10 g/m.sup.2, and the content of the surfactant in the net-like structural bodies was 20% with respect to the dry mass of the nanofibers.

The porous bodies of Examples and the sheet and porous body of Comparative Examples as obtained were evaluated according to the processes shown below, and the evaluation results are shown in Table 1.

"Value of Rising of Air Resistance"

For the support, and the porous bodies of Examples and the sheet and porous body of Comparative Examples as obtained, a measurement was conducted according to JIS P 8117: 2009 "Paper and Board—Determination of Air Permeance And Air Resistance (Medium Range)—Gurley Method" by using an Oken-type smoothness and air-permeability tester (type KY-5, manufactured by Asahi Seiko Co., Ltd.). The air resistance (A) of only the support and the air resistance (B) of the porous body including a support and nanofibers attached thereto were respectively obtained, and the difference between A and B was calculated as a value of the rising of the air resistance. Here, the air resistances at blank of the supports used in the present invention were all 4 s or less.

"Number Average Pore Diameter"

The porous bodies of Examples and the sheet and porous body of Comparative Examples as obtained were observed by using a scanning electron microscope (SEM). For electroconductive coating before the observation, an osmium coater (Neoc neoosmium coater, manufactured by Meiwafosis Co., Ltd.) was used. A consideration was made so that the effect on the pore diameter was minimized, by suppressing the thickness of the coating film to 2.5 nm or less by setting the coating time to 5 seconds. A square region in which 20 or more pores of the net-like structural bodies were included was selected from the obtained SEM image (the pores of the net-like structural bodies that are in contact with the outer frame of the square are not included in the number) and analyzed by image processing software Image J. In the analysis, the areas were obtained as pixel numbers for all of the pores of the net-like structural bodies that were in the square and were not in contact with the outer frame, and converted to true circles, and the diameters were calculated. This operation was on arbitrary five portions, and an average value of the entirety was obtained. The pores having a diameter of 5 nm or less were out of the measurement since they were indefinite due to the limit of resolution.

"Net State of Nanofibers"

Figure 1:
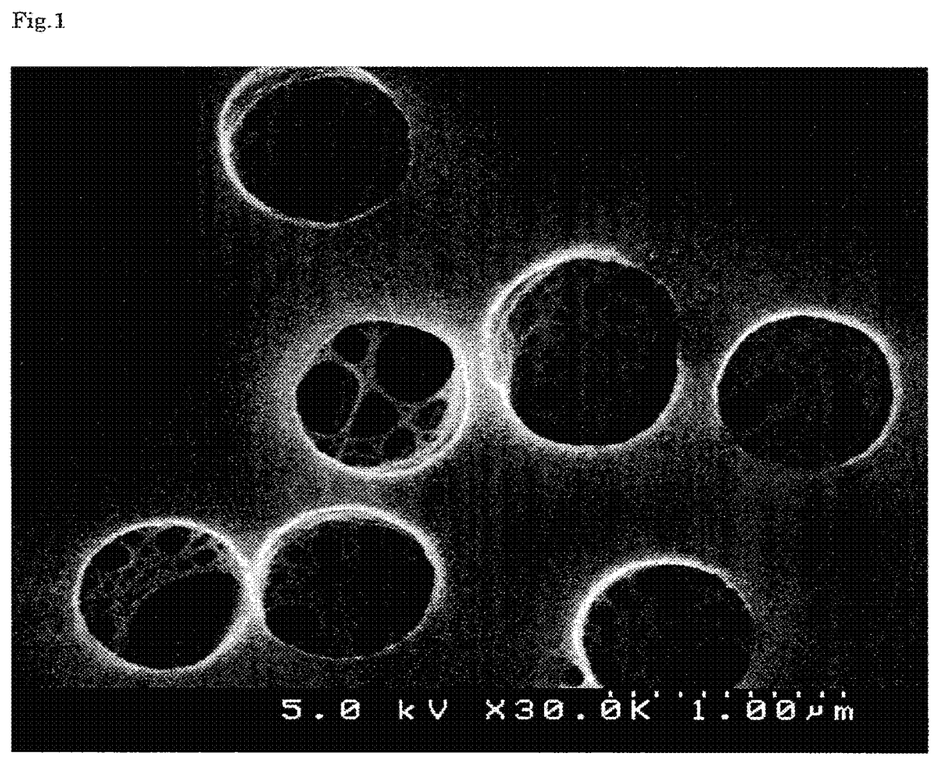
FIG. 1 is a drawing showing an observation image of the porous body having net-like structural bodies of cellulose-based nanofibers of Example 1, which is observed under a SEM.
Figure 2:
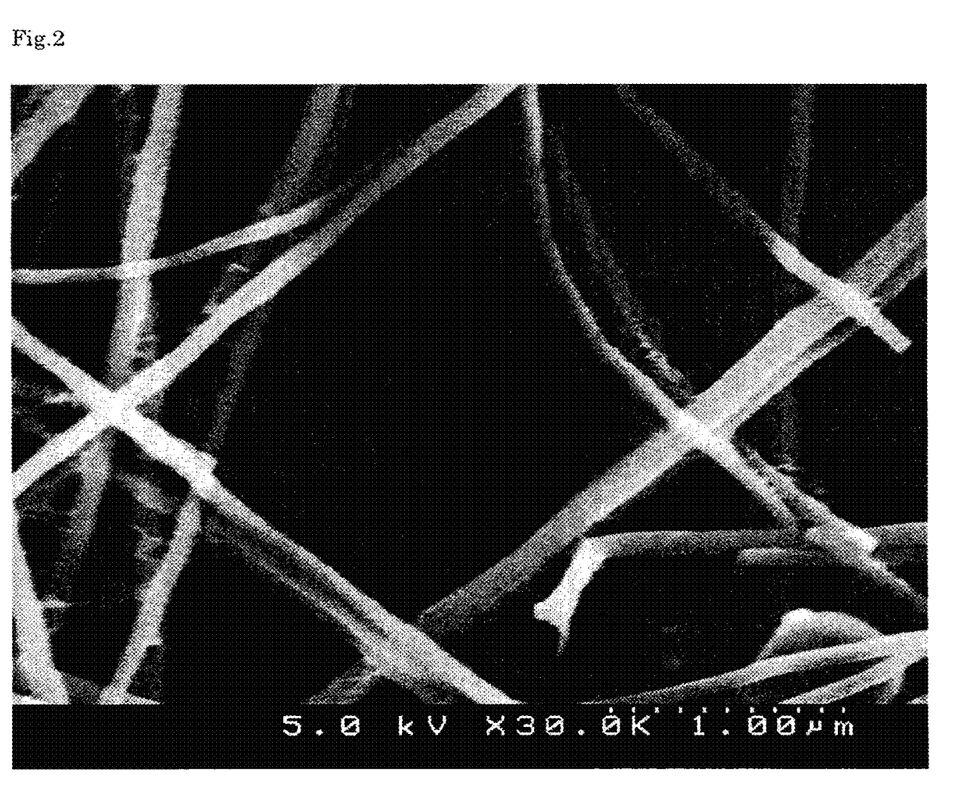
FIG. 2 is a drawing showing an observation image of the porous body having net-like structural bodies of cellulose-based nanofibers of Example 6, which is observed under a SEM.
Figure 3:
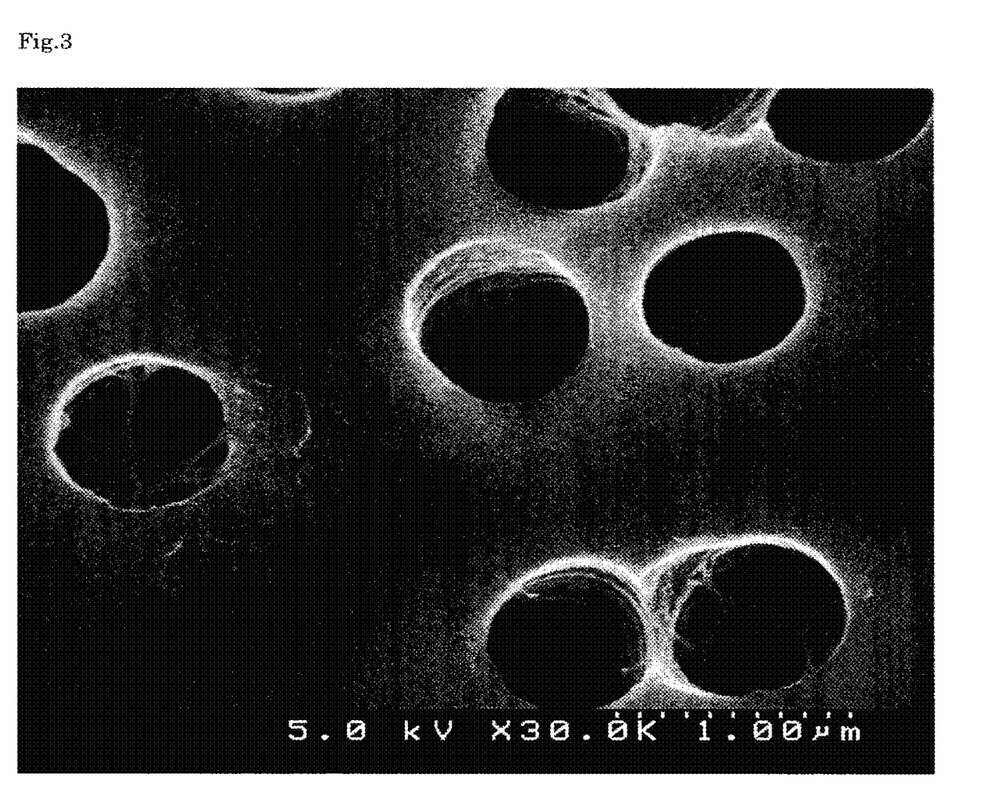
FIG. 3 is a drawing showing an observation image of the porous body having net-like structural bodies of cellulose-based nanofibers of Example 8, which is observed under a SEM.

The net-like structural bodies formed by the nanofibers were observed by using a scanning electron microscope (SEM), and evaluated by visual observation according to the criteria shown below. FIG. 1 shows a SEM image of the porous body of Example 1, FIG. 2 shows a SEM image of the porous body of Example 6, and FIG. 3 shows a SEM image of the porous body of Example 8.

⊙: The net formation rate was 80% or more and the open pore rate was from 50% to 90%, the flocculation and/or stacking of the nanofibers was small, and homogeneous net-like structural bodies were formed in all of the pores of the support (practical level).

○: The net formation rate was 10% or more and lower than 80% and the open pore rate was from 50% to 90%, the flocculation and/or stacking of the nanofibers was small, and net-like structural bodies were not formed in the majority of the pores of the support (practical level).

Δ: The net formation rate was 10% or more and the open pore rate was 10% or more and lower than 50%, and the flocculation and/or stacking of the nanofibers was partially present (lower limit of practical level).

x: The net formation rate was lower than 10% or the net formation rate was 10% or more, and the open pore rate was lower than 10%, and the nanofibers flocculated and/or stacked and did not form nets (level not suitable for practical use).

| | Support | | Dispersion liquid | | | | Air resistance | | | Net-like structure | |
|---|---|---|---|---|---|---|---|---|---|---|---|
| | Kind | Average fine pore diameter [μm] | Number average fiber diameter of nanofibers [nm] | Solid content concentration of nanofibers [%] | Solid content concentration of surfactant [%] | Dry temperature [°C.] | Support (A) [s] | Porous body (B) [s] | Value of raising (B − A) [s] | Number average pore diameter [nm] | Net state of nanofiber |
| Example 1 | Membrane filter | 0.8 | 4 | 0.05 | 0.01 | 105 | 3.8 | 6.1 | 2.3 | 53 | ⊙ |
| Example 2 | Membrane filter | 0.8 | 4 | 0.05 | 0.01 | 105 | 3.7 | 6.1 | 2.4 | 49 | ⊙ |
| Example 3 | Membrane filter | 0.8 | 4 | 0.05 | 0.01 | 30 | 3.8 | 6.3 | 2.5 | 58 | ⊙ |
| Example 4 | Membrane filter | 0.8 | 4 | 0.01 | 0.01 | 105 | 3.6 | 4.3 | 0.7 | 92 | ○ |
| Example 5 | Membrane filter | 0.8 | 4 | 0.60 | 0.12 | 105 | 3.7 | 27.7 | 24 | 31 | Δ |
| Example 6 | Glass fiber sheet | 2.7 | 4 | 0.05 | 0.01 | 105 | 0.6 | 1.9 | 1.3 | 56 | ⊙ |
| Example 7 | Glass fiber sheet | 15 | 4 | 0.05 | 0.01 | 105 | 0.1 | 0.6 | 0.5 | 59 | ○ |
| Example 8 | Membrane filter | 0.8 | 4 | 0.05 | 0 | 105 | 3.5 | 4.5 | 1 | 66 | ○ |
| Example 9 | Membrane filter | 0.8 | 64 | 0.15 | 0.03 | 105 | 3.8 | 7 | 3.2 | 148 | ○ |
| Comparative Example 1 | None | — | 4 | 0.05 | 0.01 | 105 | — | Infinity | — | none | X |
| Comparative Example 2 | Membrane filter | 0.8 | 430 | 0.15 | 0.03 | 105 | 3.7 | 5.9 | 2.2 | none | X |

As is understood from Table 1 and FIGS. 1 to 3, the porous bodies of Examples 1 to 9 each had net-like structural bodies that were formed by extensively putting the cellulose-based nanofibers into the pores of the support and had a large surface area, and the air resistances of the porous bodies were all 10,000 s or less, and thus the porous bodies had fluid permeance. It was able to confirm that a porous body having fluid permeance, which contains cellulose-based nanofibers having an extremely thin fiber diameter and high hydrophilicity can be obtained by a relatively convenient manufacture process.

In Examples 1 to 3, homogeneous net-like structural bodies of the nanofibers were formed in the majority of the pores of the support. In Example 4, the solid content concentration of the nanofibers in the dispersion liquid was smaller than that of Example 1, and thus net-like structural bodies of the nanofibers were not formed in a part of the pores of the support, and the air resistance was lower than that of Example 1. In Example 5, the solid content concentration of the nanofibers in the dispersion liquid was higher than that of Example 1, and thus stacking of the nanofibers was observed in the pores of the support, and the air resistance was higher than that of Example 1. In Example 8, net-like structural bodies of the nanofibers were not formed in a part of the pores of the support. The cause thereof is considered that since a surfactant was not added to the dispersion liquid, the dispersion liquid was more difficult to permeate into the pores of the support than in Example 1, and thus the effect of the surfactant was able to be confirmed. In Example 9, finer MFC was used as the nanofibers, and homogeneous net-like structural bodies of the nanofibers were formed in the pores of the support. Furthermore, in Examples 6 and 7, a glass fiber sheet was used as the support, and the average fine pore diameter was larger than that of the membrane filter used in Example 1, and a porous body in which net-like structural bodies of the nanofibers had been formed in the pores of the support was able to be obtained.

In Comparative Example 1, since a support was not used, the nanofibers flocculated and the air resistance was high, and thus the fluid permeance was poor. In Comparative Example 2, since the number average fiber diameter of the nanofibers was more than 100 nm, net-like structural bodies were not formed in the pores of the support.

INDUSTRIAL APPLICABILITY

The porous body according to the present invention can provide a porous body having fluid permeance, which contains cellulose-based nanofibers having an extremely thin fiber diameter and high hydrophilicity at low cost. Accordingly, the porous body according to the present invention can be preferably used in various fields and applications such as functional filters, wiping materials, materials for electronic devices and recycled medical materials.

What is claimed is:

1. A process for manufacturing a porous body, including:
    preparing an aqueous dispersion liquid of nanofibers having water as a dispersion medium with cellulose-based nanofibers that have an average fiber diameter from 1 to 4 nm and dispersed therein,
    attaching the aqueous dispersion liquid of nanofibers to a porous support having a plurality of pores that connect with one another,
    removing the aqueous dispersion liquid of nanofibers attached to a surface of the porous support excluding an inside of pores of the porous support, and
    subsequently drying the porous support including the aqueous dispersion liquid of nanofibers in the pores of the porous support to remove the water dispersion medium;
    wherein the porous support is a hydrophilic support;
    wherein the nanofibers are part of the hydroxyl groups in cellulose molecules in the cellulose-based nanofibers, in which a part of the hydroxyl groups in the cellulose molecules are oxidized to at least one functional group selected from the group consisting of a carboxyl group and an aldehyde group, and have a cellulose type I crystal structure;
    wherein the attaching comprises forming a microthin film of the aqueous dispersion liquid of nanofibers in the pores of the porous support;
    wherein the nanofibers in the aqueous dispersion liquid of nanofibers are entangled to form net-like structural bodies in the microthin film; and
    wherein the drying comprises removing the water from the microthin film to form the net-like structural bodies in which the nanofibers are entangled in the pores, and the drying is performed by at least one drying operation selected from the group consisting of: forced drying by heat, and natural drying by ambient air.

2. The process for manufacturing a porous body according to claim 1, wherein the cellulose-based nanofibers are present in an amount from 0.001 to 0.500% by mass in terms of solid content concentration with respect to the total mass of the aqueous dispersion liquid of nanofibers.

3. The process for manufacturing a porous body according to claim 1, wherein the aqueous dispersion liquid of nanofibers further contains a surfactant that is present in an amount from 0.0001 to 1.0000% by mass in terms of solid content concentration with respect to the total mass of the aqueous dispersion liquid of nanofibers.

4. The process for manufacturing a porous body according to claim 1, wherein the aqueous dispersion liquid of nanofibers contains a cationic surfactant.

5. The process for manufacturing a porous body according to claim 3, wherein the surfactant is a cationic surfactant.

6. The process for manufacturing a porous body according to claim 2, wherein the aqueous dispersion liquid of nanofibers further contains a surfactant that is present in an amount from 0.0001 to 1.0000% by mass in terms of solid content concentration with respect to the total mass of the aqueous dispersion liquid of nanofibers.

7. The process for manufacturing a porous body according to claim 6, wherein the surfactant is a cationic surfactant.

8. The process for manufacturing a porous body according to claim 1, wherein the cellulose-based nanofibers are derived from a raw material that contains at least one pulp selected from the group consisting of: kraft pulp derived from various wood materials, sulfite pulp, waste paper pulp, mechanical pulp and non-wood pulp.

9. The process for manufacturing a porous body according to claim 1, wherein the porous support is at least one support selected from the group consisting of: inorganic fiber sheets, animal fiber sheets, metal fiber sheets, porous films, porous ceramics, recycled fiber sheets, vinylon sheets and polyvinylidene chloride sheets.

10. The process for manufacturing a porous body according to claim 1, wherein the removing is by squeezing with a roll dehydrator, by using a water absorbing felt, or by using a water absorbing paper.

11. The process for manufacturing a porous body according to claim 1, wherein the attaching is by at least one process selected from the group consisting of: an impregnation process, an application process, and a spraying process.

12. The process for manufacturing a porous body according to claim 1, wherein the porous support has an average fine pore diameter of from 0.1 to 20 μm.

* * * * *